Patented Jan. 24, 1939

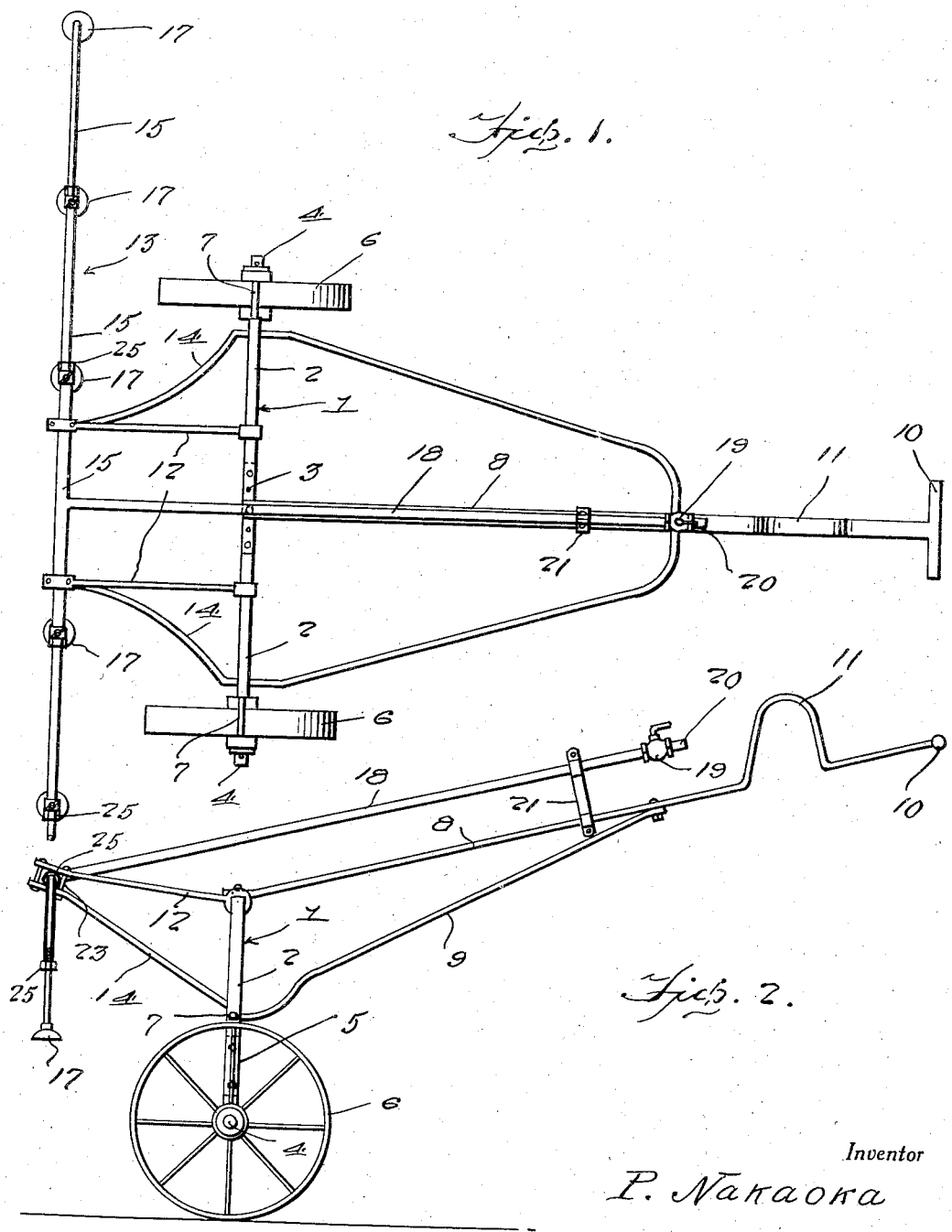

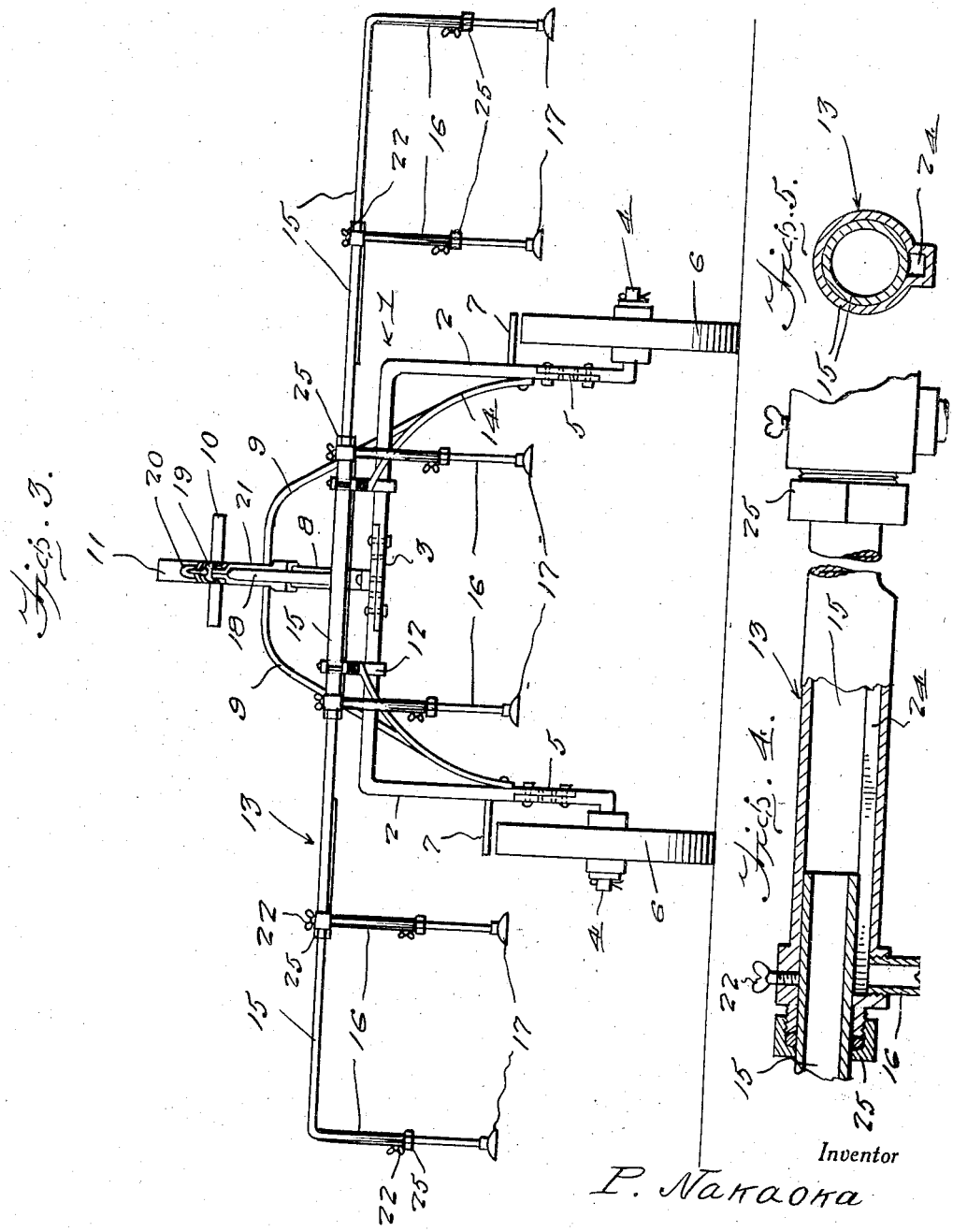

2,144,890

UNITED STATES PATENT OFFICE 2,144,890

PLANT SPRAYER

Phillip Nakaoka, Venice, Calif., assignor of one-half to James E. Bailie, Los Angeles, Calif.

Application January 18, 1938, Serial No. 185,589

1 Claim. (Cl. 299—57)

The present invention relates to new and useful improvements in plant sprayers and has for one of its important objects to provide, in a manner as hereinafter set forth, an implement of this character embodying a construction and arrangement which is such that a plurality of rows may be sprayed simultaneously.

Another very important object of the invention is to provide a sprayer of the aforementioned character which may be conveniently adjusted to meet various conditions.

Other objects of the invention are to provide a sprayer of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of a sprayer constructed in accordance with the present invention.

Figure 2 is a view in side elevation thereof.

Figure 3 is a view in front elevation of the invention.

Figure 4 is a view in vertical longitudinal section through an intermediate portion of the spray pipe.

Figure 5 is a view in cross section through the spray pipe.

Referring now to the drawings in detail, it will be seen that the embodiment of the invention which has been illustrated comprises a substantially U-shaped frame member which is designated generally by the reference numeral 1, said frame member being of any suitable metal. The frame member 1 includes duplicate sections 2 which are adjustably secured together at 3. The reference numeral 4 designates spindles which are mounted on the end portions of the frame member 1 for vertical adjustment, as at 5. Supporting wheels 6 are journalled on the spindles 4. Cleaners 7 for the wheels 6 project from the frame member 1.

Connected at one end to the frame member 1 is a tongue 8. Braces 9 extend from an intermediate portion of the tongue 8 to the end portions of the frame member 1. On the free end of the tongue 8 is a handle 10. Adjacent the handle 10, the tongue 8 has formed therein an upstanding, substantially U-shaped portion 11.

Mounted at spaced points on the upper portion of the frame member 1 and projecting forwardly therefrom is a pair of arms 12. Mounted on the arms 12 is a spray pipe which is designated generally by the reference numeral 13 and which, it is noted, extends transversely of the implement. Braces 14 assist the arms 12 in supporting the spray pipe 13.

The spray pipe 13 may be of any suitable length and comprises telescopically adjustable sections 15. Depending from the spray pipe 13 are discharge branch pipes 16 having mounted on their lower ends spray heads 17. The discharge branch pipes 16 also comprise telescopic sections in order that the spray heads 17 may be adjusted vertically. Extending rearwardly from the spray pipe 13 is a supply pipe 18 which is provided with a control valve 19 for connection with a hose 20 from a suitable source of fluid under pressure. A bracket 21 supports the supply pipe 18 on the tongue 8.

In use, the device may be either pushed or pulled over the field either by hand or through the medium of some other source of power, such as a tractor. The adjustable connections 5 permit the supporting frame to be adjusted vertically according to the height of the crop and the adjustable connection 3 allows the distance between the supporting wheels 6 to be regulated as desired to travel between the rows or in the furrows. Also, the telescopic sections 15 comprising the pipe 13 permit the spray heads 17 to be adjusted toward or away from each other and the telescopic sectional branch pipes 16 allow vertical adjustment of said spray heads. The hose 20 may be of any desired or necessary length. When the device is connected to a tractor, the fluid under pressure may be mounted on said tractor. Set screws 22 releasably secure the sections comprising the pipes 13 and 16 in adjusted position. It will be noted that the spray pipe 13 is clamped between the end portions of the arms 12 and the braces 14 by bolts 23. It will also be noted that all but the end sections of the adjustable spray pipe 13 include channels 24 communicating with the respective pipes 16. This is shown to advantage in Figures 4 and 5 of the drawing. Suitable packings 25 are provided at the joints of the telescopic pipe sections for preventing leakage.

It is believed that the many advantages of a sprayer constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:—

A plant sprayer of the class described comprising a substantially U-shaped frame member including a pair of adjustably connected sections, spindles mounted for vertical adjustment on the end portions of said frame member, supporting wheels journalled on the spindles, a tongue connected to the frame member and extending forwardly therefrom, braces extending between said tongue and the end portions of the frame member, arms mounted on the frame member at spaced points and extending rearwardly therefrom, a spray pipe mounted transversely on said arms and comprising a plurality of telescopically adjustable sections, discharge pipes depending from the spray pipe at spaced points and including spray heads on their lower ends, a supply pipe connected to the spray pipe and extending therefrom over the tongue, and means for supporting the supply pipe on the tongue.

PHILLIP NAKAOKA.